US011799294B2

(12) United States Patent
Takada et al.

(10) Patent No.: US 11,799,294 B2
(45) Date of Patent: Oct. 24, 2023

(54) SUPPLYING AT LEAST PORTION OF EXCESS POWER FROM ONE PORTABLE POWER SUPPLY DEVICE TO ANOTHER PORTABLE POWER SUPPLY DEVICE

(71) Applicant: HONDA MOTOR CO., LTD., Tokyo (JP)

(72) Inventors: Sho Takada, Wako (JP); Nobuyuki Sasaki, Wako (JP); Mitsuhiro Ito, Wako (JP); Mio Oshima, Wako (JP); Ryo Oshima, Wako (JP); Yoshihiro Matsunaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 742 days.

(21) Appl. No.: 16/939,544

(22) Filed: Jul. 27, 2020

(65) Prior Publication Data

US 2020/0358287 A1    Nov. 12, 2020

Related U.S. Application Data

(63) Continuation of application No. PCT/JP2018/035854, filed on Sep. 27, 2018.

(30) Foreign Application Priority Data

Feb. 19, 2018    (JP) .................................. 2018-027210

(51) Int. Cl.
*H02J 3/38*    (2006.01)
*H02J 13/00*    (2006.01)
(Continued)

(52) U.S. Cl.
CPC ............ *H02J 3/381* (2013.01); *G05B 19/042* (2013.01); *G06Q 20/145* (2013.01); *G06Q 50/06* (2013.01);
(Continued)

(58) Field of Classification Search
CPC ................. H02J 3/381; H02J 13/00032; H02J 13/00022; H02J 13/00002; H02J 3/00;
(Continued)

(56) References Cited

U.S. PATENT DOCUMENTS

| 2012/0271474 A1 | 10/2012 | Yoneda et al. | |
| 2013/0293023 A1* | 11/2013 | Collie | H02J 3/40 307/87 |
| 2015/0207326 A1* | 7/2015 | Stenson | H02K 7/1815 307/65 |

FOREIGN PATENT DOCUMENTS

| JP | 62-145440 U | 9/1987 |
| JP | 2004-15882 A | 1/2004 |

(Continued)

OTHER PUBLICATIONS

International Search Report dated Dec. 18, 2018, issued in counterpart International Application No. PCT/JP2018/035854. (2 pages).
(Continued)

*Primary Examiner* — Ryan Johnson
(74) *Attorney, Agent, or Firm* — WHDA, LLP

(57) ABSTRACT

A power supply system comprises a portable first power supply device and second power supply device. The portable first power supply device has a handle to be gripped by a hand of a user. A supply unit of the portable first power supply comprises an inverter circuit which converts at least a portion of excess power into an alternating current, and supplies to the second power supply device via a second connection unit and a power line, power of the alternating current outputted from the inverter circuit.

7 Claims, 12 Drawing Sheets

(51) Int. Cl.
  *G05B 19/042* (2006.01)
  *G06Q 20/14* (2012.01)
  *G06Q 50/06* (2012.01)
  *H02J 3/00* (2006.01)
  *H02J 1/08* (2006.01)
  *H02J 4/00* (2006.01)

(52) U.S. Cl.
  CPC .............. *H02J 1/08* (2013.01); *H02J 3/00* (2013.01); *H02J 4/00* (2013.01); *H02J 13/00002* (2020.01); *H02J 13/00022* (2020.01); *H02J 13/00032* (2020.01); *G05B 2219/2639* (2013.01)

(58) Field of Classification Search
  CPC ............ H02J 1/08; H02J 4/00; H02J 2300/10; H02J 2310/12; H02J 3/46; H02P 9/02; H02K 19/34; F02B 63/048; G05B 2219/2639
  See application file for complete search history.

(56) References Cited

FOREIGN PATENT DOCUMENTS

| | | |
|---|---|---|
| JP | 2011-83086 A | 4/2011 |
| JP | 2013-21798 A | 1/2013 |
| JP | 2013-229999 A | 11/2013 |
| JP | 2017-153267 A | 8/2017 |
| JP | 2017-195739 A | 10/2017 |
| JP | 2017-211947 A | 11/2017 |
| WO | WO-2018168646 A1 * | 9/2018 ............ H01M 10/48 |

OTHER PUBLICATIONS

International Preliminary Report on Patentability (Form PCT/IPEA/409) of International Application No. PCT/JP2018/035854 dated Apr. 4, 2019. (11 pages).

* cited by examiner

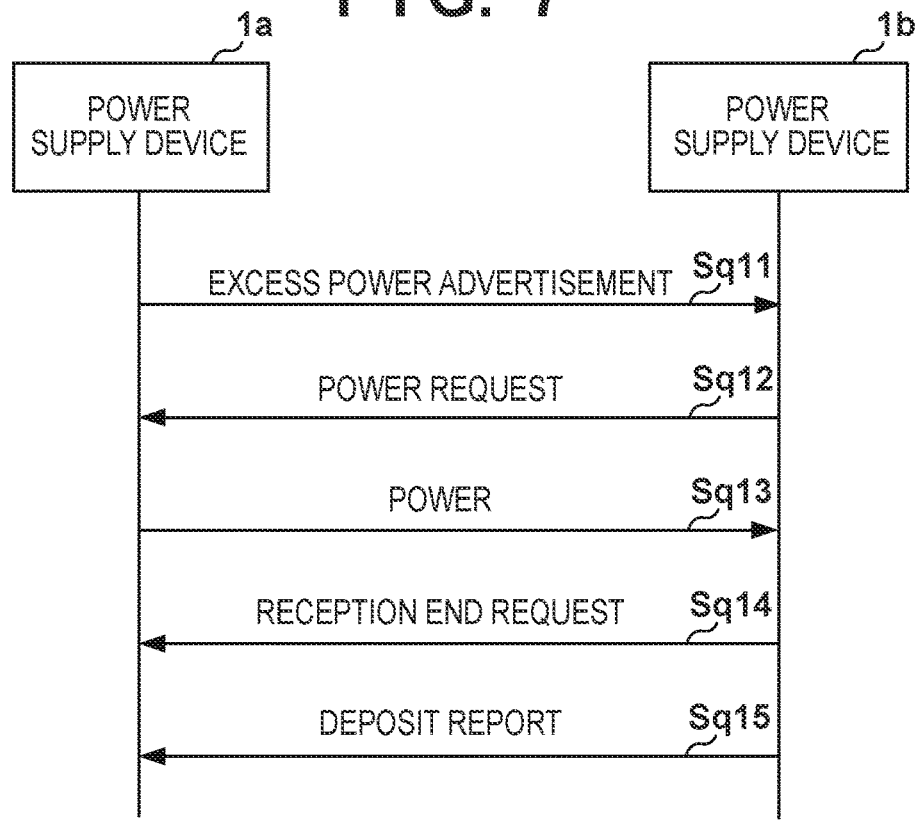
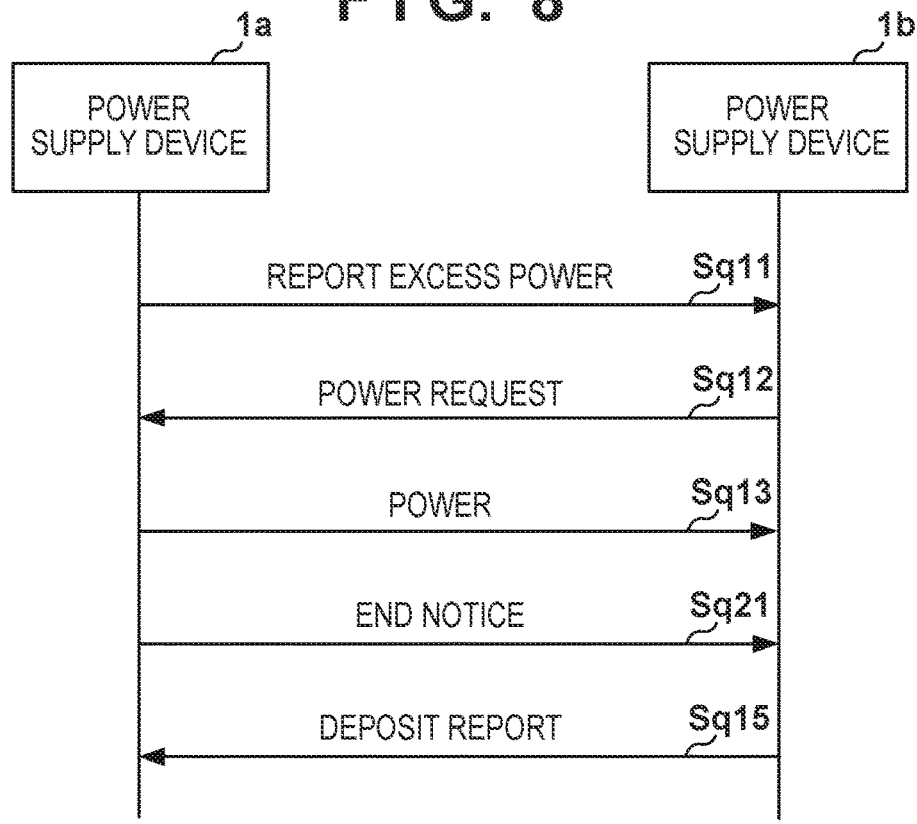

SUPPLYING AT LEAST PORTION OF EXCESS POWER FROM ONE PORTABLE POWER SUPPLY DEVICE TO ANOTHER PORTABLE POWER SUPPLY DEVICE

CROSS-REFERENCE TO RELATED APPLICATION(S)

This application is a continuation of International Patent Application No. PCT/JP2018/035854 filed on Sep. 27, 2018, which claims priority to and the benefit of Japanese Patent Application No. 2018-027210 filed on Feb. 19, 2018, the entire disclosure of which are incorporated herein by reference.

BACKGROUND OF THE INVENTION

Field of the Invention

The present invention relates to supplying at least a portion of excess power from one portable power supply device to another portable power supply device.

Description of the Related Art

In a commercial AC power supply network, electric power generated by a large-scale power plant is transmitted to each household or business place through a transmission network. Japanese Patent Laid-Open No. 2013-21798 proposed to provide a power management system for managing units and incentives for distributing excess power in a situation in which it is necessary to cope with excess power accompanying an increase in power generation units at the consumer side, such as in the case of large-scale utilization of a distributed power supply. Japanese Patent Laid-Open No. 2017-211947 proposed a power management device, a power system, a consumer device, a power management method, and a power management program capable of effectively utilizing excess power to enhance the economical effect of power saving.

PTL1 and PTL2 both relate to a commercial AC power supply network, but it is thought that power networks independent from the commercial AC power supply network will be set up in campgrounds and the like. Camping enthusiasts bring engine-driven portable generators to the campground and use electronic appliances there. When the engine runs out of fuel, the portable generator will be unable to generate electricity, and the camping enthusiast will be unable to use their appliances. Meanwhile, because a large number of camping enthusiasts gather at the campground, one camping enthusiast's portable generator may not be able to generate electricity, while another camping enthusiast's portable generator may be able to generate electricity. In addition, another camping enthusiast may wish to have their portable generator supply power to their own loads while also supplying excess power to another camping enthusiast. The present invention relates to enabling supply of at least a portion of excess power from one portable power supply device to another portable power supply device.

SUMMARY OF THE INVENTION

The present invention provides a power supply system comprising a portable first power supply device and second power supply device, that each has a power generation unit and supplies power to a load. The first power supply device may comprise: a power storage unit configured to store power generated by the power generation unit; a first connection unit configured to connect with the load; a second connection unit configured to connect with a power line connected to the second power supply device; a supply unit configured to, via the first connection unit, supply, to a load, power stored in the power storage unit; a monitoring unit configured to monitor a power consumption of the load; and a decision unit configured to, based on the power consumption of the load monitored by monitoring unit and on a power storage amount of the power storage unit, decide an excess power of the power storage unit. The portable first power supply device is a power supply device that can be held by a user and that comprises a handle to be gripped by a hand of the user. The power supply system is independent of a commercial AC power supply network. The supply unit may comprise an inverter circuit configured to convert at least a portion of the excess power into an alternating current, and is configured to supply, to the second power supply device via the second connection unit and the power line, power of the alternating current outputted from the inverter circuit.

BRIEF DESCRIPTION OF THE DRAWINGS

FIG. 7 is a sequence diagram illustrating a power supply method.
FIG. 8 is a sequence diagram illustrating a power supply method.

DESCRIPTION OF THE EMBODIMENTS

Figure 1:
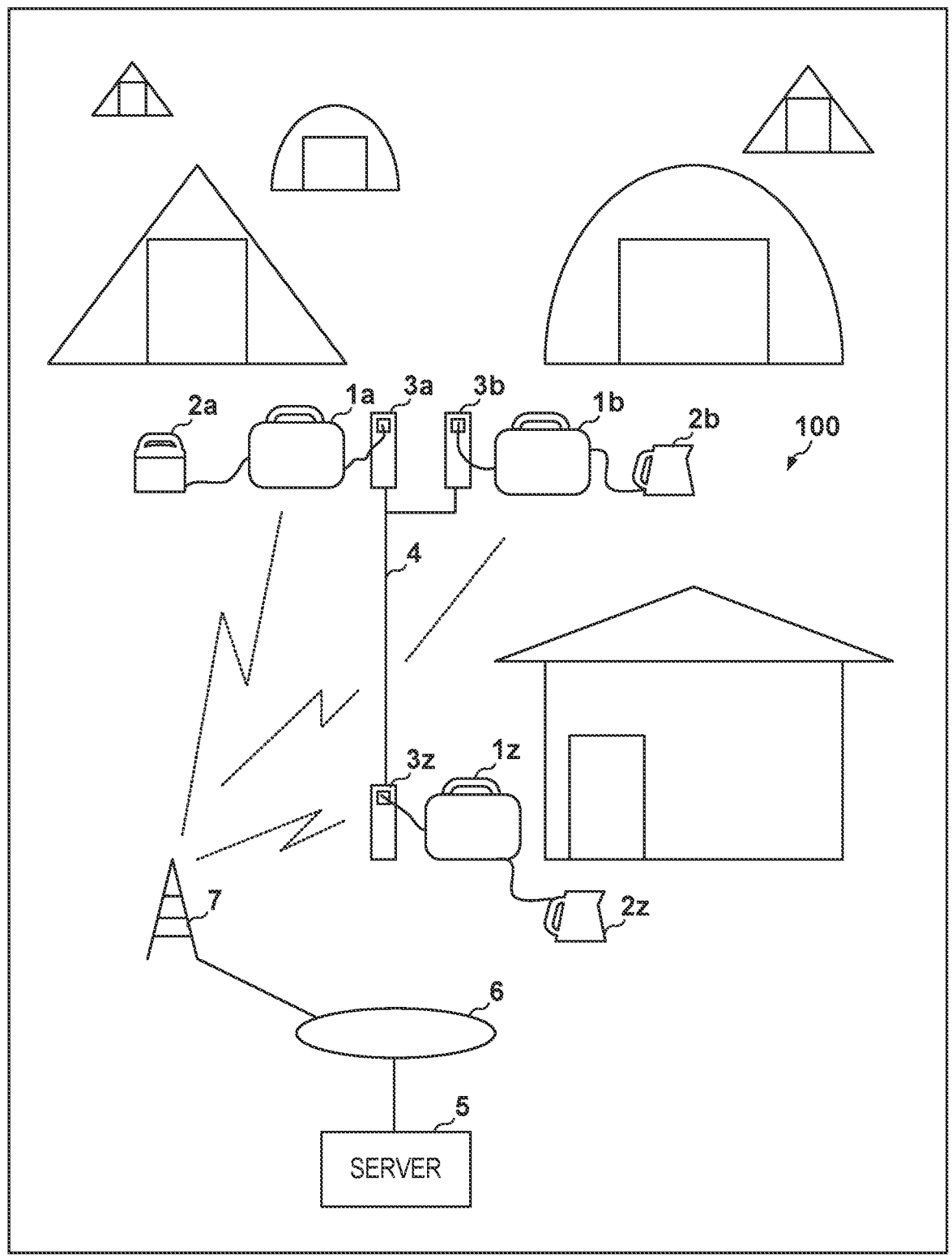
FIG. 1 is a view illustrating a power supply system.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Power Supply System>

FIG. 1 illustrates a power supply system 100 installed in a campground. A lowercase alphabet letter appended to the end of the reference numeral is to distinguish between identical or similar devices. Such an alphabet letter is omitted when a matter common to a plurality of devices is described. At the campground, multiple camping enthusiasts (users) set up tents or stay in bungalows and the like. A first user has a power supply device 1a which is a portable generator. The power supply device 1a supplies power that is generated or stored to a load 2a. A second user has a power supply device 1b which is a portable generator. The power supply device 1b supplies power that is generated or already stored to a load 2b. A power line 4 is stretched around the campground. A plurality of connecting terminals 3a, 3b, and 3c are connected to the power line 4. The connecting terminals 3a and 3b which are for connecting the power line 4 to a tentsite are provided. The power supply device 1a is connected to the connecting terminal 3a. The power supply device 1a supplies excess power to the power line 4 or receives, from the power supply devices 1b and 1z, their excess power. The power supply device 1b is connected to the connecting terminal 3b. The power supply device 1b supplies excess power to the power line 4 or receives, from power supply devices 1a and 1z, their excess power. The connecting terminal 3z is also provided in a management building in which the manager who manages the campground resides. The power supply device 1z supplies excess power to the power line 4 or receives, from the power supply devices 1a and 1b, their excess power. The power supply devices 1a, 1b, and 1z each may be an engine-driven generator, a storage battery, or an engine-driven generator with a storage battery. Although three power supply devices 1a, 1b, and 1z are illustrated here for simplicity of illustration, there need only be two or more power supply devices 1 for the power supply system.

A server 5 is a computer provided at the campground or outside the campground. The server 5 may communicate with the power supply devices 1a, 1b, and 1z via a network 6 and a wireless base station 7. A power line 4 may be utilized for power line conveyed communication. In such cases, the power supply devices 1a, 1b, and 1z may communicate over the power line 4. The management building may also have a router for connecting to the network 6. The power supply devices 1a, 1b, and 1z communicate with the server 5 through the power line 4 and a router. Incidentally, the server 5 is optional. The wireless base station 7 may be a base station for cellular communications or a wireless LAN access point. The server 5 may mediate the supply/reception of electric power between a plurality of power supply devices, make a money transfer of a compensation, or acquire identification information of a load connected to the power supply device 1 (e.g., name, type, power consumption) from the power supply device 1.

<Power Supply Device>

Figure 2:
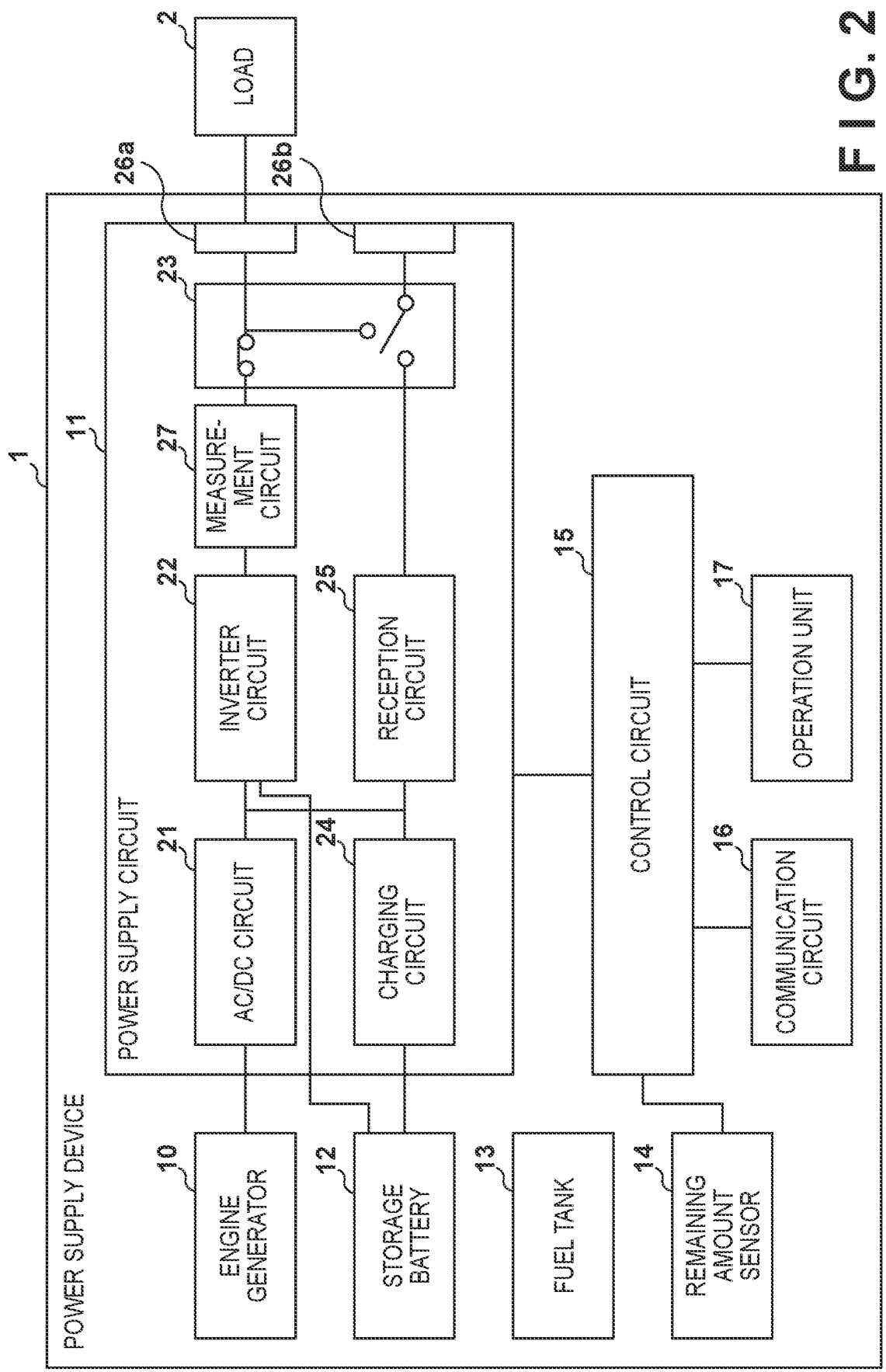
FIG. 2 is a view illustrating a power supply device.

FIG. 2 is a block diagram illustrating a power supply device 1. The engine generator 10 includes an engine that operates in accordance with the fuel supplied from the fuel tank 13 and a generator that is driven by the engine to generate electricity. The fuel may be, for example, gasoline, liquefied petroleum gas, hydrogen, or the like. A power supply circuit 11 is a circuit for converting the voltage generated by the engine generator 10 into a predetermined alternating current or direct current. An AC/DC circuit 21 includes a rectifying smoothing circuit or the like that rectifies and smoothes the alternating current generated by the engine generator 10 to produce a direct current. An inverter circuit 22 is a circuit for converting the direct current outputted from the AC/DC circuit 21 or a storage battery 12 into a stable alternating current of a predetermined frequency. The inverter circuit 22 may convert the direct current output from the storage battery 12 into a stable alternating current of a predetermined frequency. An AC terminal 26a is a terminal to which the load 2 is connected. The AC terminal 26b is a terminal to which the load 2 is connected or the power line 4 is connected. The AC terminal 26b may be a dedicated terminal for connecting the power line 4. A switch circuit 23, in response to a control signal from a control circuit 15, connects the inverter circuit 22 and the AC terminal 26b, or connects a reception circuit 25 and the AC terminal 26b. For example, when causing the AC terminal 26b to function as an AC outlet, the control circuit 15 controls the switch circuit 23, and thereby connects the inverter circuit 22 and the AC terminal 26b. When causing the AC terminal 26b to function as an AC inlet, the control circuit 15 controls the switch circuit 23 to thereby connect the AC terminal 26a and the AC terminal 26b (direct connection), or to connect the reception circuit 25 and the AC terminal 26b (indirect connection). In the latter case, the alternating current inputted from the AC terminal 26b is converted into direct current by the reception circuit 25 and supplied to the charging circuit 24 or the inverter circuit 22. Incidentally, since a function of the reception circuit 25 and a function of the AC/DC circuit 21 are common, they may be integrated as one circuit. The charging circuit 24 charges the storage battery 12 using the power inputted from the AC terminal 26b. Ordinarily, the charging circuit 24 charges the storage battery 12 using the power outputted from the AC/DC circuit 21. The control circuit 15 is a circuit for controlling the power supply circuit 11, a communication circuit 16, an operation unit 17, or the like. The communication circuit 16 communicates with a smartphone or a PC (personal computer) via wire or wirelessly, and communicates with other power supply devices 1 and the server 5. The operation unit 17 includes a display device and an input device. A remaining amount sensor 14 measures a remaining amount of fuel contained in the fuel tank 13, or measures an amount of power stored in the storage battery 12, and outputs the measurement result to the control circuit 15. A measurement circuit 27 is a circuit for measuring the power supplied to the load 2 (power consumption in the load 2) and outputting the measurement result to the control circuit 15. The control circuit 15 obtains the power that can be supplied by the power supply device 1 from the power generated by the engine generator 10 and the amount of power stored by the storage battery 12. Further, the control circuit 15 obtains the power consumption of the load 2 by using the measurement circuit 27. The control circuit 15 obtains, as excess power, the difference between the power that can be supplied and the power consumption of the load 2. Power consumption of the power supply device 1 itself may also be added to the power consumption. If there is excess power, the control circuit 15 may output a message indicating that there is excess power to the smartphone, another power supply device 1 or the server 5 through a display device of the operation unit 17 or the communication circuit 16. When the control circuit 15 receives a reception request from an input device of the operation unit 17 or a smartphone, another power supply device 1 or the server 5 through the communication circuit 16, the control circuit 15 starts the supply of power to the power line 4 through the switch circuit 23.

Figure 3:
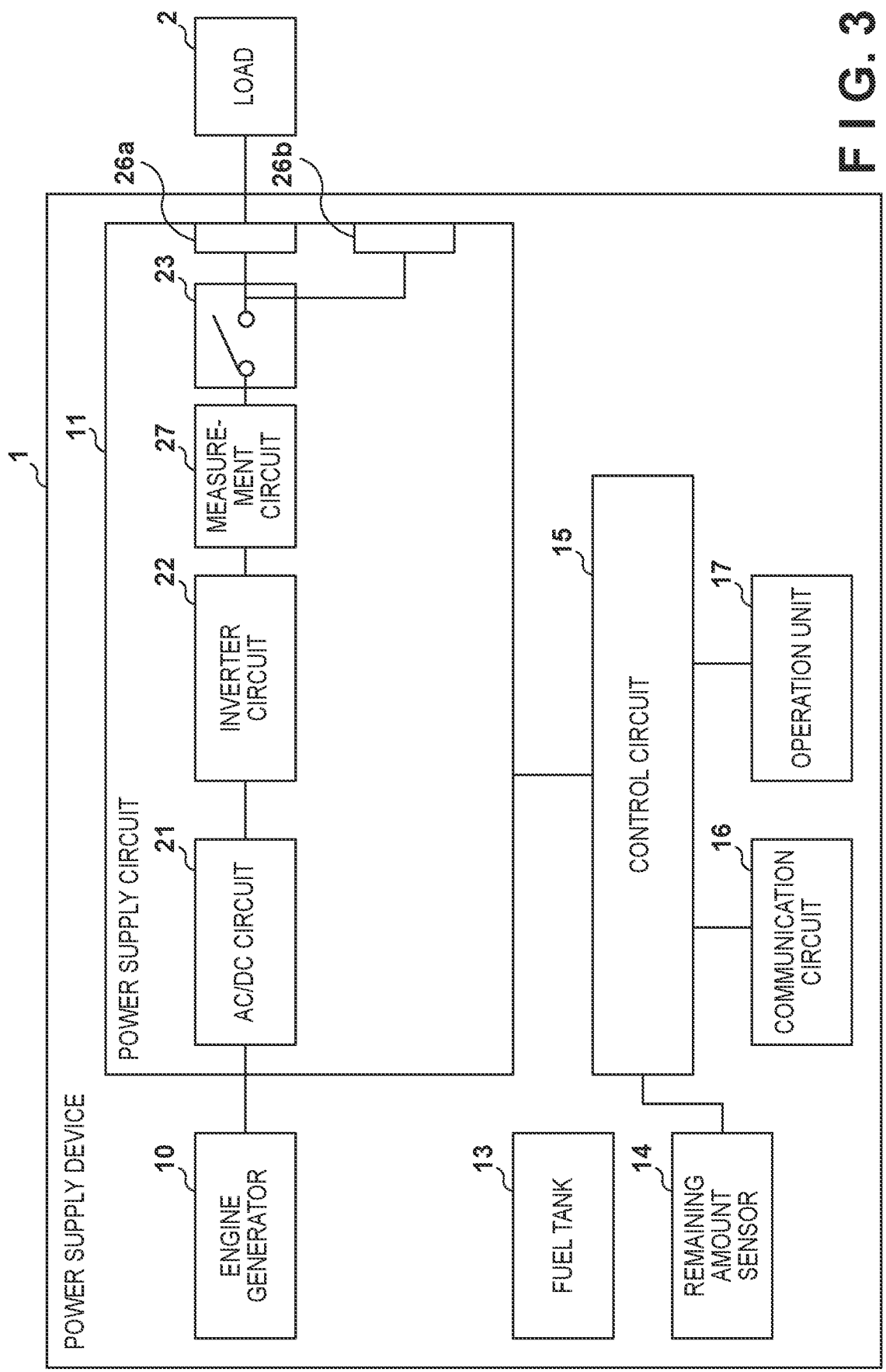
FIG. 3 is a view illustrating the power supply device.

FIG. 3 is a block diagram illustrating a power supply device 1 without a storage battery 12. Compared to FIG. 2, the circuits associated with the storage battery 12 are omitted in FIG. 3. This type of power supply device 1 can supply power to the load 2 only during periods when the engine generator 10 is in operation. Incidentally, when the power supply device 1 receives the supply of power from the other power supply device 1 through the power line 4, the control circuit 15 may control the switch circuit 23 to cut off the inverter circuit 22 and the AC terminals 26a and 26b, and to connect the AC terminal 26a and the AC terminal 26b. In this case, the power line 4 is connected to the AC terminal 26b, and the load 2 is connected to the AC terminal 26a. Power supplied from the power line 4 is supplied to the load 2 through the AC terminal 26b and the AC terminal 26a.

Figure 4:
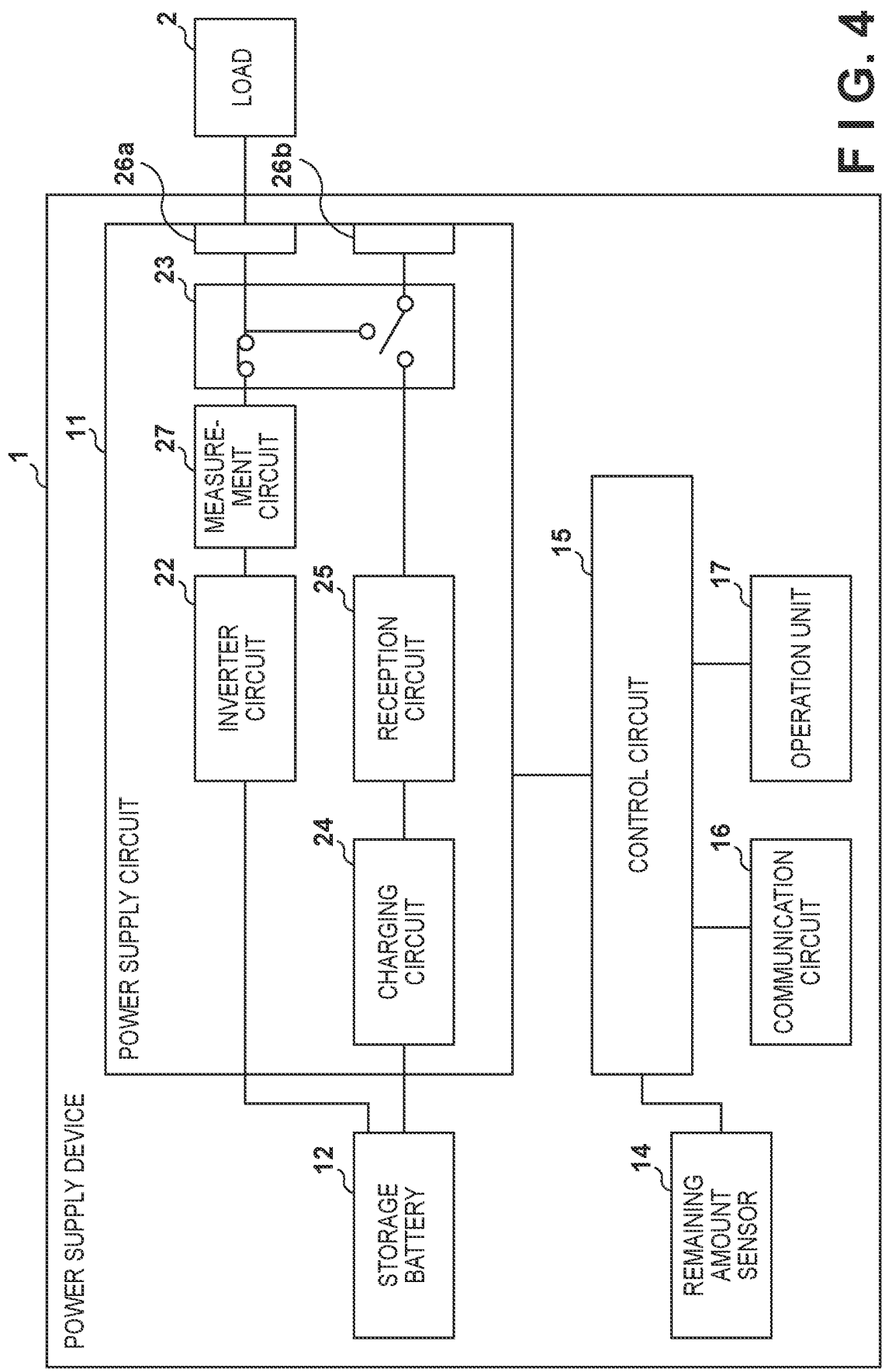
FIG. 4 is a view illustrating the power supply device.

FIG. 4 is a block diagram illustrating a power supply device 1 without the engine generator 10. Compared to FIG. 2, the circuits associated the engine generator 10 are omitted in FIG. 4. In this case, the storage battery 12 is charged by power supplied from another power supply device 1 via the power line 4 and the AC terminal 26b.

<Power Supply Sequence>

Figure 5:
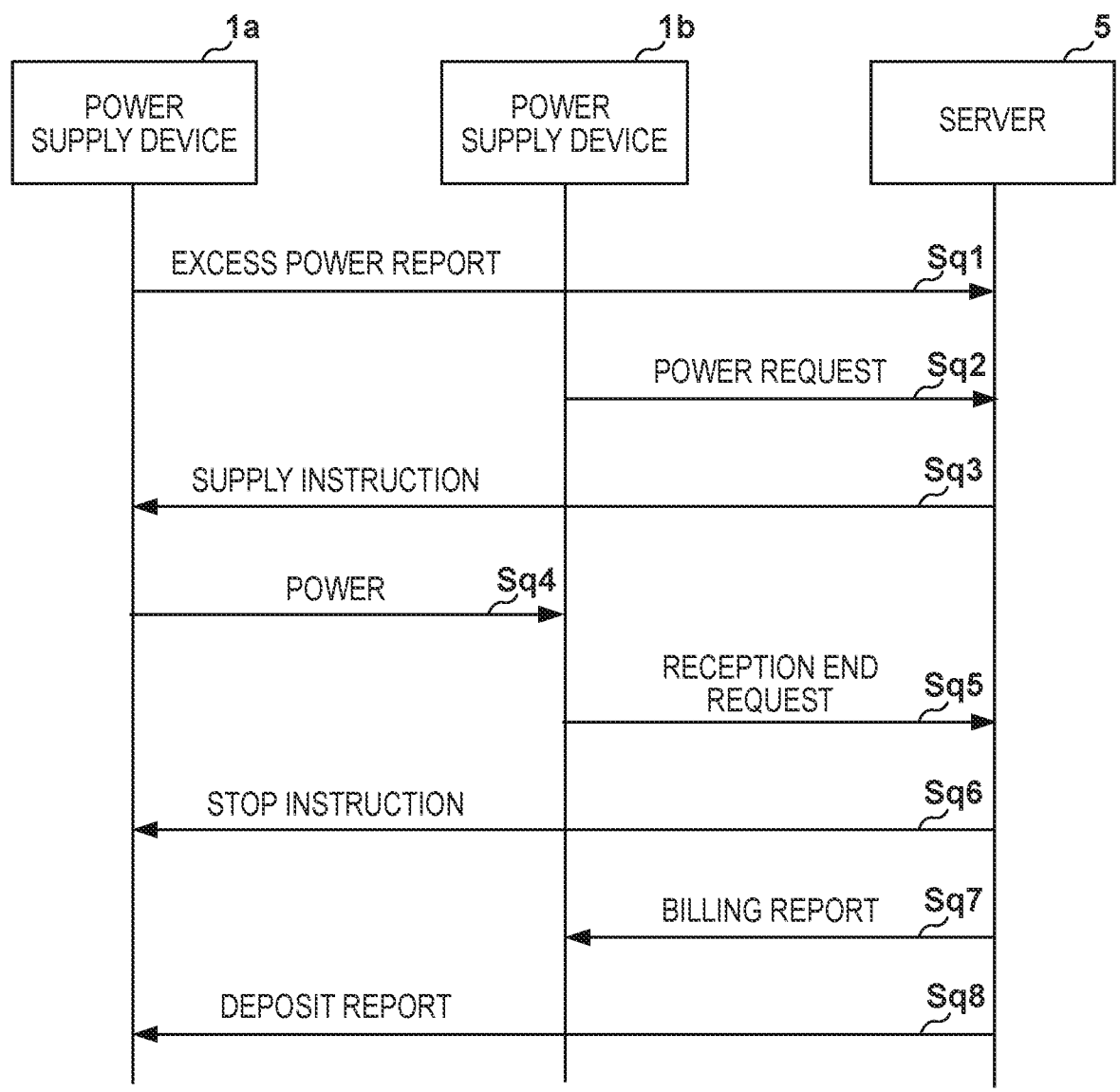
FIG. 5 is a sequence diagram illustrating a power supply method.

FIG. 5 is a sequence diagram illustrating a power supply method. Here, it is assumed that the power supply device 1a supplies power to the power supply device 1b.

In Sq1, the power supply device 1a obtains the excess power and transmits, to the server 5, an excess power report indicating that there is excess power or the excess power value. The server 5 receives the excess power report and recognizes the existence of the power supply device 1a which is capable of supplying power.

In Sq2, the power supply device 1b transmits, to the server 5, a power request (reception request) indicating that it wants to receive power. The server 5 receives the power request and recognizes the existence of the power supply device 1b which desires to receive power. Note that Sq2 may be executed before Sq1.

In Sq3, the server 5 transmits a power supply instruction to the power supply device 1a. It should be noted that the server 5 may transmit a reception approval to the power supply device 1b.

In Sq4, the power supply device 1a initiates the supply of power to the power line 4 in accordance with the received supply instruction. The power supply device 1b receives power supplied from the power supply device 1a through the power line 4 in accordance with the reception approval.

When an instruction to stop reception is made by the user through the operation unit 17 or the like in Sq5, the power supply device 1b transmits a stop request (reception end request) to the server 5. The power supply device 1b may measure the sum of the received power (total received power amount) and include it in the reception end request that it transmits.

In Sq6, the server 5 transmits a stop instruction for stopping the power supply to the power supply device 1a in accordance with the received reception end request. Upon receiving the stop instruction, the power supply device 1a stops supplying power to the power line 4. Incidentally, the power supply device 1a may measure the total value of the power outputted to the power line 4 (total supply power amount) and transmit it to the server 5. If there is only one power supply device 1 that supplies power and one power supply device 1 that receives power, the total received power amount and the total supplied power amount will coincide. Incidentally, when the power supply device 1z also receives power, the total supplied power amount of the power supply device 1a is equal to the sum of the total received power amount of the power supply device 1b and the total received power amount of the power supply device 1z. Incidentally, when the power supply device 1z is also supplies power, the total supplied power amount of the power supply device 1a is equal to the sum of the total power amount supplied by the power supply device 1b and the total power amount supplied by the power supply device 1z.

In Sq7, the server 5 bills the account of the user of the power supply device 1b for a compensation obtained based on the total received power amount received from the power supply device 1b, and transmits a billing report indicating the compensation to the power supply device 1b.

In Sq8, the server 5 makes a money transfer to the account of the user of the power supply device 1a for the compensation calculated based on the total supplied power amount received from the power supply device 1a, and transmits a deposit report indicating the compensation to the power supply device 1b.

Figure 6:
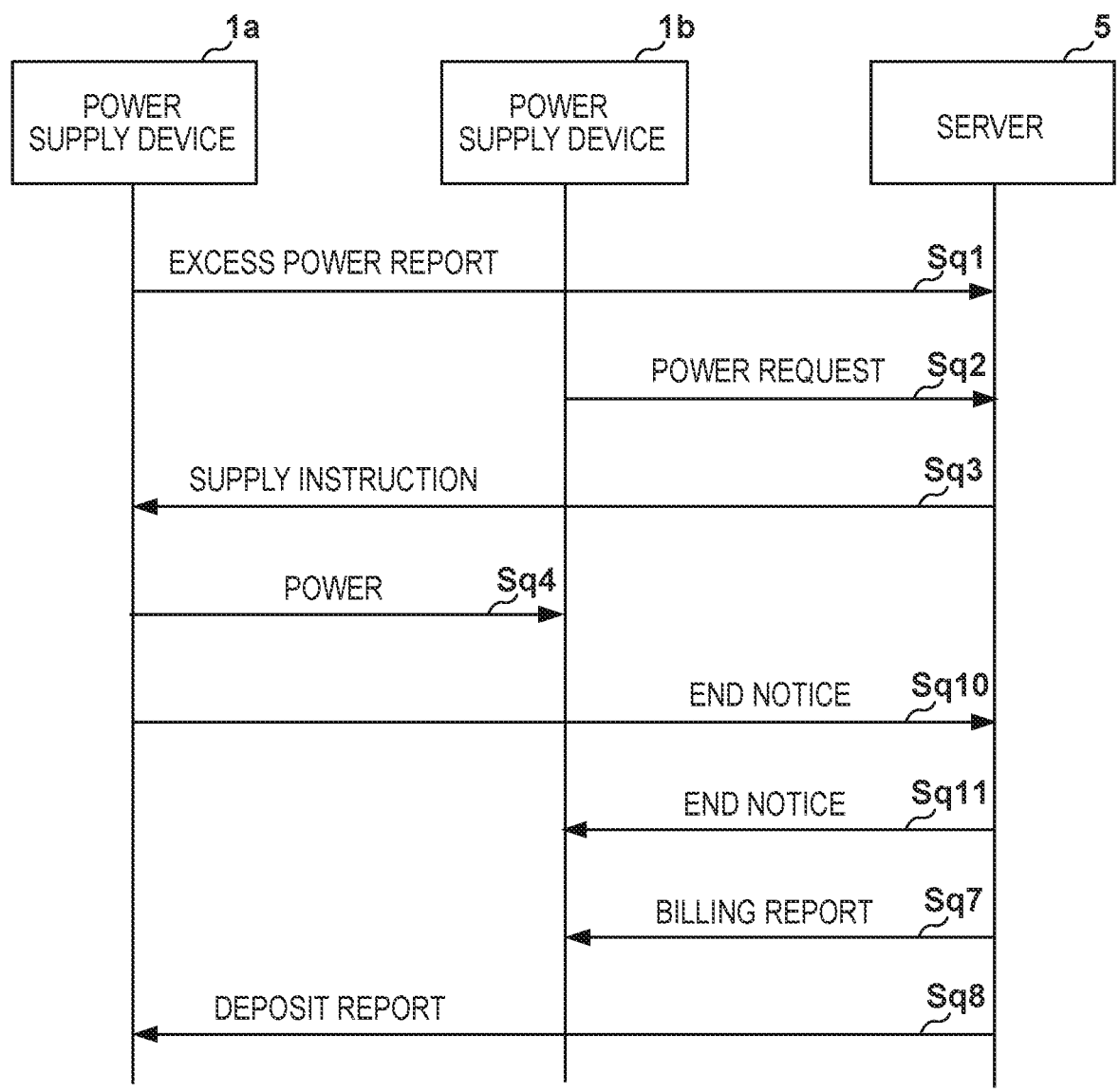
FIG. 6 is a sequence diagram illustrating a power supply method.

FIG. 6 is a sequence diagram illustrating a power supply method. Here, it is assumed that the power supply device 1a supplies power to the power supply device 1b. Also, in the power supply device 1a, if the power storage amount is insufficient, fuel is insufficient, or the power consumption of the load 2a is increased, the power supply device 1a will no longer be able to supply enough power. Therefore, the power supply device 1a may transmit an end notice Sq10 to the server 5 to prompt the power supply device 1b to stop the load 2b. In FIG. 6, parts common to those in FIG. 5 are given the same reference numerals, and the description of FIG. 5 is invoked therefor.

In Sq10, when the power storage amount is insufficient, fuel is insufficient, or the power consumption of the load 2a is increased, the power supply device 1a transmits an end notice to the notifying the server 5 and the power supply device 1b that the supply of power will be ended.

When Sq11 receives the end notice from the power supply device 1a, the server 5 transmits the end notice to the power supply device 1b. Upon receiving the end notice from the server 5, the power supply device 1b stops supplying power to the load 2b or outputs a message prompting stoppage on the display device or the like of the operation unit 17.

FIG. 7 is a sequence diagram illustrating a peer-to-peer type power supply method in which the server 5 is not involved.

In Sq11, the power supply device 1a calculates the excess power and transmits, to the power supply device 1b or the like, an excess power advertisement indicating that there is excess power or the excess power value. The power supply device 1b receives the excess power advertisement and recognizes the existence of the power supply device 1a which is capable of supplying power.

In Sq12, the power supply device 1b transmits to the power supply device 1a a power request indicating that it wants to receive power. The power supply device 1a receives the power request and recognizes the existence of the power supply device 1b which desires to receive power.

In Sq13, the power supply device 1a initiates the supply of power to the power line 4 in accordance with the received power request. It should be noted that the power supply device 1a may send a reception approval to the power supply device 1b prior to starting the supply of power. The power supply device 1b receives power supplied from the power supply device 1a through the power line 4.

When an instruction to stop reception is made by the user through the operation unit 17 or the like in Sq14, the power supply device 1b transmits, to the power supply device 1a, a reception end request. Upon receiving the reception end request, the power supply device 1a stops supplying power to the power line 4.

In Sq15, the power supply device 1b measures the sum of the received power (total received power amount) to obtain the compensation. In addition, the power supply device 1b obtains information of an account of a user of the power supply device 1a from the power supply device 1a and makes a money transfer for the compensation to the acquired account. In addition, the power supply device 1b transmits a deposit report to the power supply device 1a indicating that a money transfer of the compensation was made.

FIG. 8 is a sequence diagram illustrating a peer-to-peer type power supply method in which the server 5 is not involved. Sq14 in FIG. 7 is replaced by Sq21.

In Sq21, when the power storage amount is insufficient, fuel is insufficient, or the power consumption of the load 2a is increased, the power supply device 1a transmits an end notice for the notifying the power supply device 1b that the supply of power is to end. Upon receiving the end notice from the power supply device 1a, the power supply device 1b stops supplying power to the load 2b or outputs a message prompting for stoppage on the display device or the like of the operation unit 17.

<Flowchart>

Figure 9:
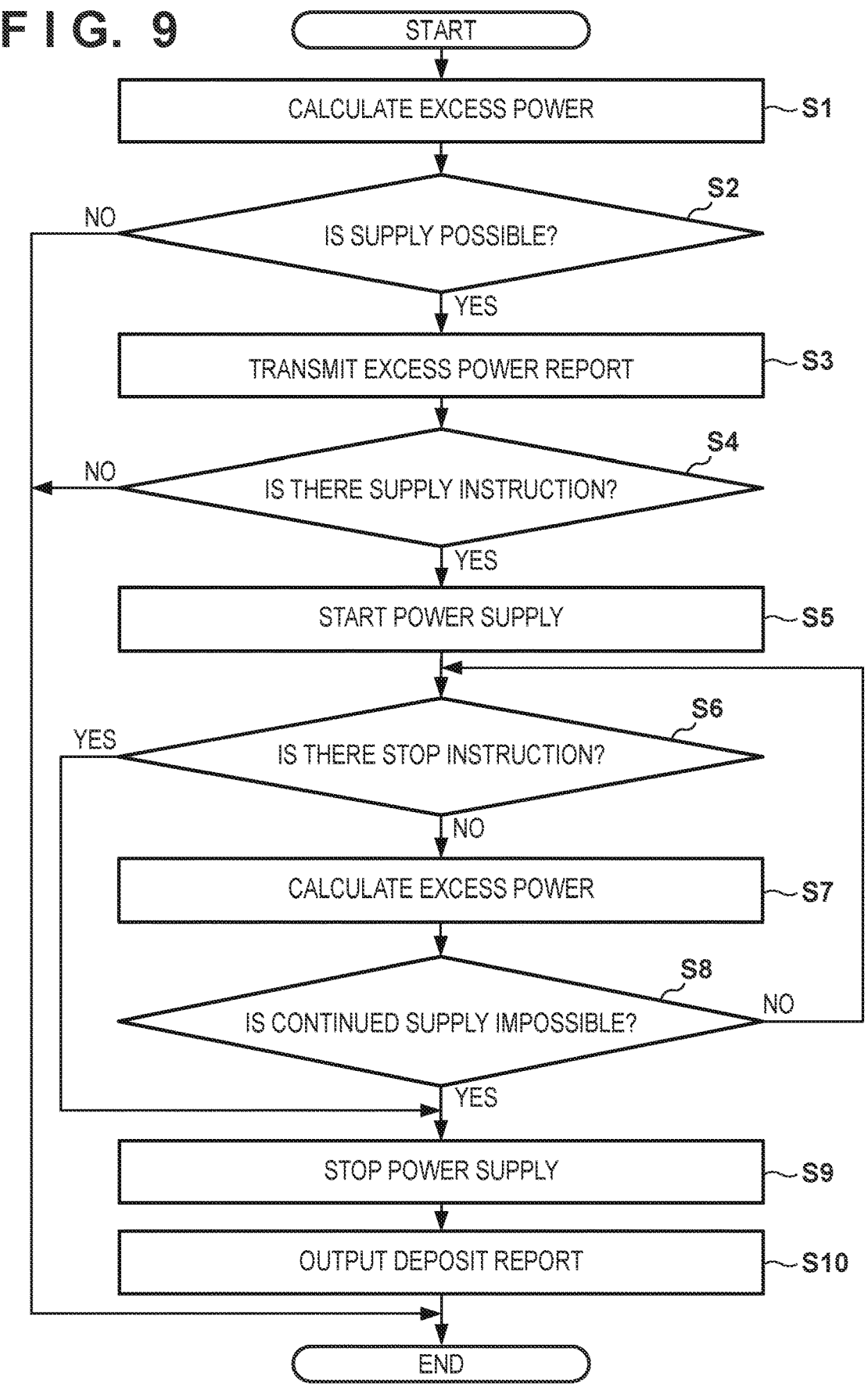
FIG. 9 is a flowchart illustrating a power supply method.

FIG. 9 is a flowchart illustrating a power supply method performed by the power supply device 1a that supplies power. The control circuit 15 includes a CPU (central processing unit) and a storage device, and the CPU may execute the following processes in accordance with a control program stored in the storage device. The following processes may be performed by hardware circuits such as field programmable gate arrays (FPGA) and digital signal processors (DSPs). These hardware circuits may be collectively referred to as a processor.

The control circuit 15 in step S1 calculates excess power based on a measurement result of the remaining amount sensor 14 (e.g., an amount of power stored, a power generation amount) and a measurement result of the measurement circuit 27 (a power consumption by the load 2a).

In step S2, the control circuit 15 compares the excess power with a threshold to determine whether or not at least a portion of the excess power can be supplied to the other power supply device 1b. The threshold may be, for example, 0W. Alternatively, the threshold may be a power consumption of the power supply device 1a itself. If it is not possible to supply power, the control circuit 15 ends the power supply method. On the other hand, if power can be supplied, the control circuit 15 proceeds to step S3.

In step S3, the control circuit 15 generates an excess power report (or excess power advertisement) and transmits it to the server 5 or the like via the communication circuit 16. The excess power report is transmitted to a specific communication device (the server 5 or the power supply device 1) but the excess power advertisement is transmitted to an unspecified communication device.

In step S4, the control circuit 15 determines whether or not a power supply instruction (or a reception request) has been received from the server 5 or the like via the communication circuit 16. If no supply instruction has been received, the control circuit 15 ends the power supply method. If the supply instruction has been received, the control circuit 15 proceeds to step S5.

The control circuit 15 in step S5 controls the switch circuit 23 to start supplying power to the power supply device 1b via the power line 4 by connecting the AC terminal 26b and the inverter circuit 22.

In step S6, the control circuit 15 determines whether or not an instruction to stop power supply has been received from the server 5 or the like via the communication circuit 16. The control circuit 15 proceeds to step S9 upon receiving the stop instruction, the process proceeds to step S7 if no stop instruction has been received.

The control circuit 15 in step S7 calculates excess power based on a measurement result of the remaining amount sensor 14 (e.g., an amount of power stored, a power generation amount) and a measurement result of the measurement circuit 27 (a power consumption by the load 2a).

In step S8, the control circuit 15 determines whether power can be continuously supplied to the power supply device 1b based on whether the excess power is equal to or greater than the power requested by the power supply device 1b. When the control circuit 15 determines that the supply is impossible, the process proceeds to step S9, and when it determines that the supply is possible, the process returns to step S6.

The control circuit 15 in step S9 controls the switch circuit 23 to stop supplying power to the power supply device 1b through the power line 4.

In step S10, the control circuit 15 receives a deposit report through the communication circuit 16, and outputs the deposit report to the display device of the operation unit 17 or the like. The deposit report may be outputted to a display device such as a smartphone through the communication circuit 16.

Figure 10:
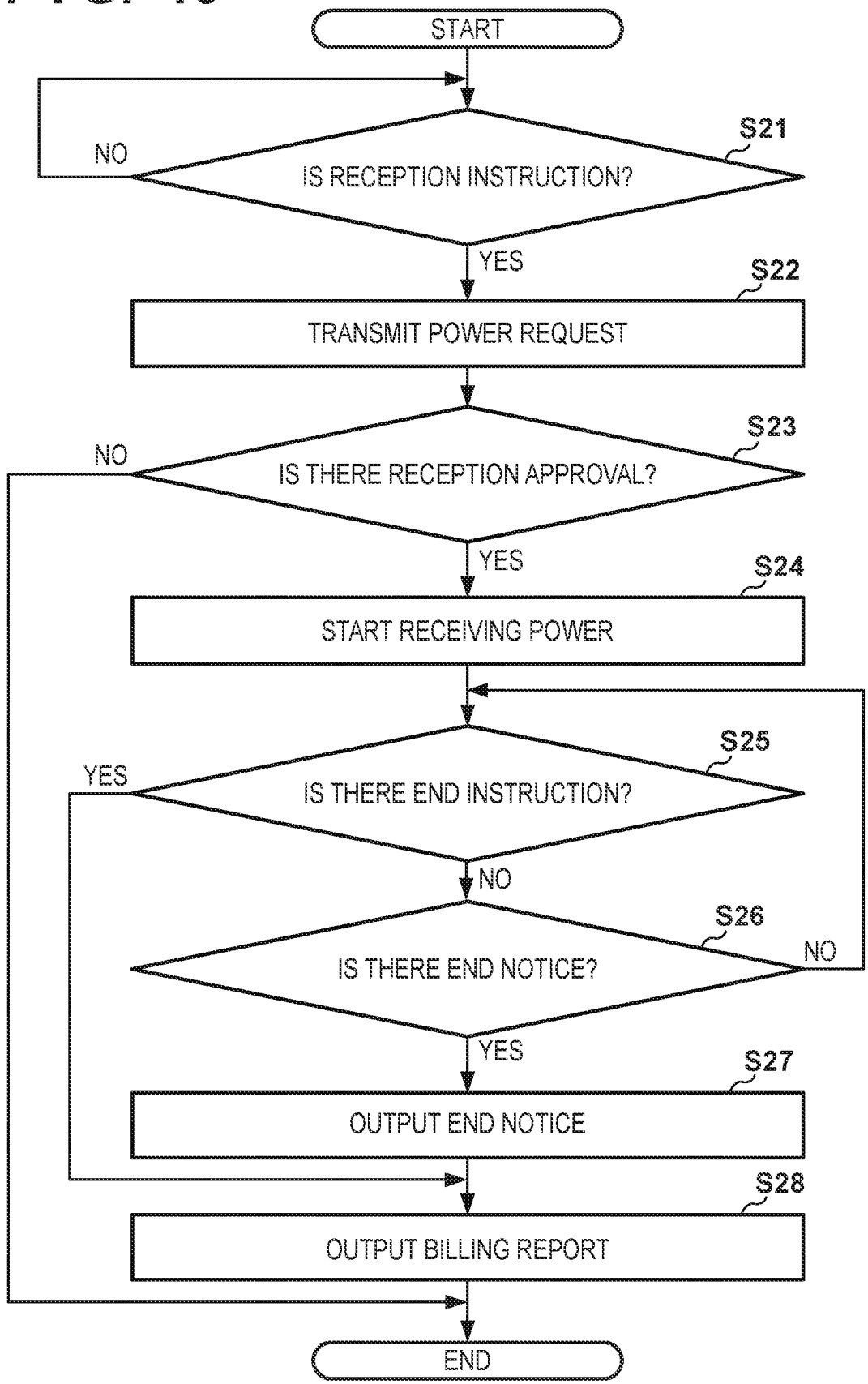
FIG. 10 is a flowchart illustrating a power supply method.

FIG. 10 is a flowchart illustrating a power supply method performed by the power supply device 1b that receives power.

The control circuit 15 in step S21 determines whether or not a power reception instruction is input from a smartphone or the like connected to the operation unit 17 and the communication circuit 16. The control circuit 15, when a reception instruction is input, advances to step S22.

In step S22, the control circuit 15 transmits a power request (reception request) to the server 5 or the like. The power request may include information of the power consumption (rated power consumption) of the load 2b that is measured by the measurement circuit 27 or input via the operation unit 17 or the communication circuit 16.

In step S23, the control circuit 15 determines whether or not a supply approval (reception approval) has been received from the server 5 or the like via the communication circuit 16. If the reception approval cannot be received, the control circuit 15 ends the power supply method (power reception method). On the other hand, when the reception approval is received, the control circuit 15 proceeds to step S24.

The control circuit 15 in step S24 starts receiving power. In other words, the control circuit 15 controls the switch circuit 23 to supply to the load 2b the power supplied from the power supply device 1a through the power line 4.

The control circuit 15 in step S25 determines whether or not a reception end instruction is input from a smartphone or the like connected to the operation unit 17 and the communication circuit 16. The control circuit 15, when a reception end instruction is input, advances to step S28. If the reception end instruction has not been input, the control circuit 15 proceeds to step S26.

In step S26 the control circuit 15 determines whether or not an end notice has been received from the server 5 or the power supply device 1a via the communication circuit 16. The control circuit 15, when an end notice is received, advances to step S27. If an end notice has not been received, the control circuit 15 returns to step S25.

In step S27, the control circuit 15 outputs an end notice to a display device of the operation unit 17 or a smartphone or the like connected to the communication circuit 16.

In step S28, the control circuit 15 outputs a billing report received from the server 5 to a display device of the operation unit 17 or a smartphone connected to the communication circuit 16 or the like. Incidentally, the control circuit 15 switches the state of the switch circuit 23 from a reception state to a non-reception state. In the non-reception state, the power supply device 1b supplies power to the load 2b from its own engine generator 10 or storage battery 12.

Figure 11:
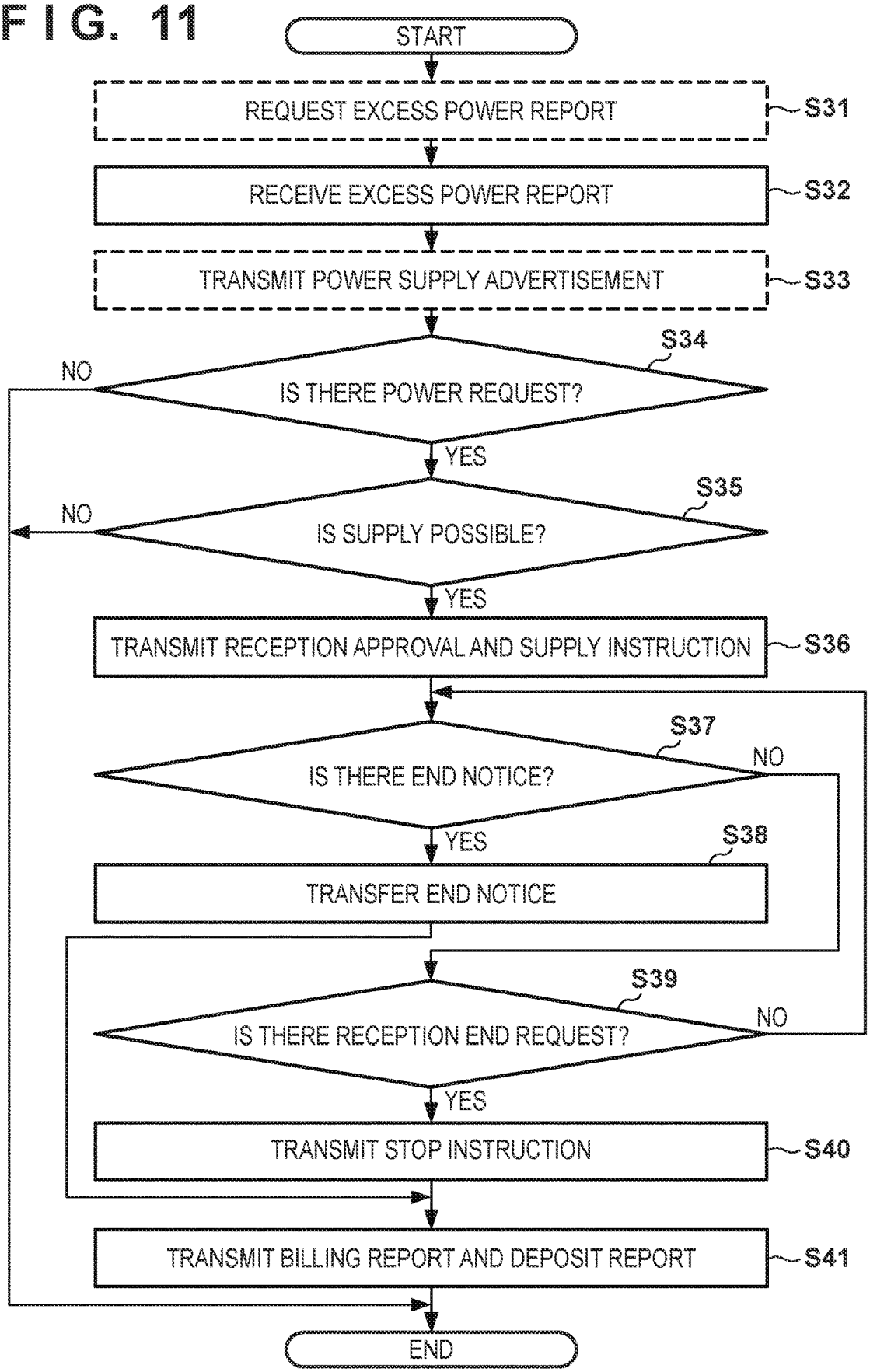
FIG. 11 is a flowchart illustrating a power supply method.
Figure 12:
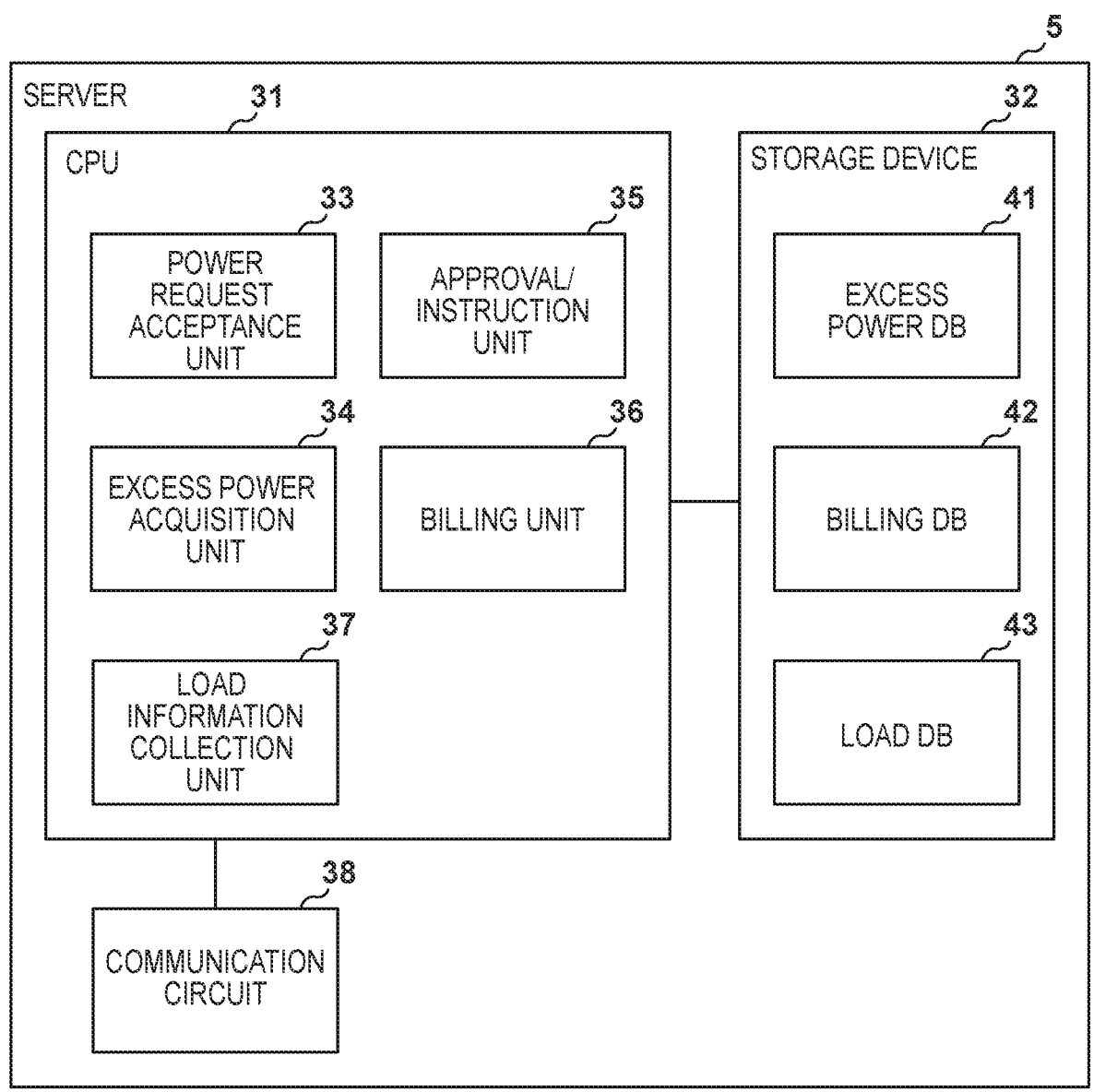
FIG. 12 is a view for describing server functions.

FIG. 11 is a flowchart illustrating a power supply method that the server 5 performs. FIG. 12 is a diagram for explaining functions of the server 5. A CPU 31 of the server 5 executes a control program stored in a storage device 32 to thereby function as a power request acceptance unit 33, an excess power acquisition unit 34, an approval/instruction unit 35, a billing unit 36, and a load information collection unit 37. The storage device 32 includes a RAM and a ROM, and stores an excess power DB 41, a billing DB 42, a load DB 43, and the like. DB is an abbreviation for database. Each function will be described in detail below.

In step S31, the CPU 31 (the excess power acquisition unit 34) requests the power supply device 1 to transmit an excess power report to the server 5. Note that step S31 may be omitted. Addresses of power supply devices 1 that can be connected to the power line 4 may be stored in advance in the storage device 32 and used by the excess power acquisition unit 34.

The CPU 31 (the excess power acquisition unit 34), in step S32, receives the excess power report from one or more power supply device 1 via a communication circuit 38. The excess power acquisition unit 34 stores, in the excess power DB 41, identification information of the power supply device 1 and the excess power report in association with each other.

In step S33, the CPU 31 (the excess power acquisition unit 34 or the power request acceptance unit 33) generates a power supply advertisement in accordance with an excess power report stored in the excess power DB 41, and transmits the power supply advertisement via the communication circuit 38 to power supply devices 1 that can be connected to the power line 4. The power supply advertisement may include information indicating the power that can be supplied through the power line 4.

In step S34, the CPU 31 (the power request acceptance unit 33) determines whether a power request has been received from any of the power supply devices 1 through the communication circuit 38. If no power request has been received, the CPU 31 ends the power supply method. On the other hand, when the power request is received, the CPU 31 proceeds to step S35.

In step S35, the CPU 31 (the approval/instruction unit 35) determines whether or not power can be supplied from any other power supply device 1 to the power supply device 1 that transmitted the power request. For example, the approval/instruction unit 35 compares the information of the power consumption of the load 2 included in the power request with the suppliable power included in the excess power report to determine whether power can be supplied. The suppliable power may be obtained from the excess power DB. Incidentally, comparison between the specific power consumption and the suppliable power is not essential. For example, when a power request is received from a power supply device 1, if there is another power supply device 1 having excess power, the approval/instruction unit 35 may determine that power can be supplied. When the approval/instruction unit 35 determines that power can be supplied, the process proceeds to step S36. On the other hand, if the approval/instruction unit 35 determines that power cannot be supplied, the power supply method is ended. In this case, the approval/instruction unit 35 may transmit rejection information indicating that the power request is not approved to the power supply device 1 that has transmitted the power request.

In step S36, the CPU 31 (the approval/instruction unit 35) transmits the reception approval (supply approval) to the power supply device 1 that has transmitted the power request, and transmits the supply instruction to the power supply device 1 that can supply the excess power. For example, the reception approval is transmitted to the power supply device 1b and the supply instruction is transmitted to the power supply device 1a.

In step S37, the CPU 31 (the approval/instruction unit 35) determines whether or not an end notice has been received from the power supply device 1 that supplied the excess power. When the end notice is received through the communication circuit 38, the approval/instruction unit 35 proceeds to step S38. If end notice has not been received, the approval/instruction unit 35 proceeds to step S39.

The CPU 31 (the approval/instruction unit 35) in step S38 transfers the end notice by the communication circuit 38 to the power supply device 1 which has received the power. Thereafter, the CPU 31 proceeds to step S41.

In step S39, the CPU 31 (the approval/instruction unit 35) determines whether or not a reception end request has been received by the communication circuit 38 from the power supply device 1 that had been receiving power. Upon receiving a reception end request, the approval/instruction unit 35 proceeds to step S40. If a reception end request has not been received, the approval/instruction unit 35 returns to step S37.

The CPU 31 (the approval/instruction unit 35) in step S40 transmits a stop instruction by the communication circuit 38 to the power supply device 1 which had been supplying the power.

In step S41, the CPU 31 (the billing unit 36) creates a billing report based on the amount of electric power received by the power supply device 1b, registers the billing report in the billing DB 42, and also transmits the billing report to the power supply device 1b. Also, the CPU 31 (the billing unit 36) creates a deposit report based on the amount of electric power supplied by the power supply device 1a, registers the deposit report in the billing DB 42, and also transmits the deposit report to the power supply device 1a. The billing DB 42 includes user account information of the power supply device 1a and user account information of the power supply device 1b. In other words, the account information may be an account from which the compensation can be withdrawn or to which a money transfer of the compensation can be made, such as a bank account, a credit account, a virtual currency account, a point account. Points are credits that can be exchanged for goods and services, discount coupons, gift certificates, or the like. In this way, the billing unit 36 functions as a money transfer unit (a compensation management unit or a credit transfer unit).

In FIG. 12, the load information collection unit 37 collects load identification information (a name or category name of a load (e.g., tool, cooking appliance, audio device, personal computer) indicating a load connected to the power supply device 1, a power consumption of a load) from the power supply device 1, and registers the load identification information in the load DB 43 in association with identification information of the power supply device 1 or identification information of a user thereof. By analyzing the load DB 43, the load information collection unit 37 can recognize what loads 2 are used in the campground.

<Summary>

Figure 13:
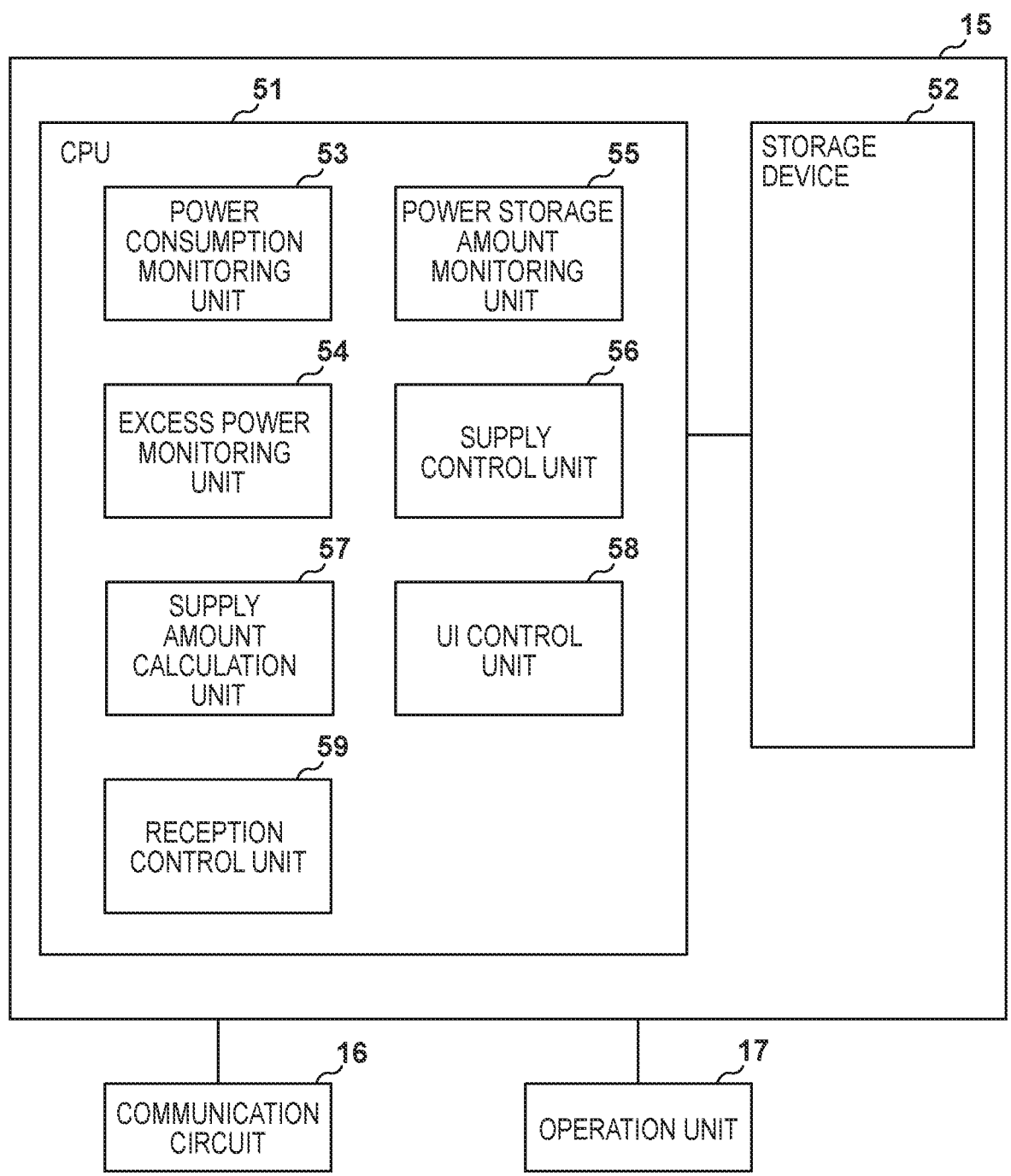
FIG. 13 is a view for describing control circuit functions.

FIG. 13 illustrates functions of the control circuit 15 of the power supply device 1. With reference to FIG. 13, technical ideas derived from the present embodiment will be exemplified. In FIG. 13, a CPU 51 executes a control program stored in the storage device 52 to thereby realize a power consumption monitoring unit 53, an excess power monitoring unit 54, a power storage amount monitoring unit 55, a supply control unit 56, a supply amount calculation unit 57, a UI control unit 58, a reception control unit 59, and the like. These are the agents that perform the previously described power supply method. The power consumption monitoring unit 53 monitors the power consumption of the load 2 using the measurement circuit 27. The excess power monitoring unit 54 obtains the excess power based on the power consumption of the load 2, the power generation capacity of the engine generator 10, an amount of power stored by the storage battery 12, and the like. The power storage amount monitoring unit 55 monitors the power generation capacity of the engine generator 10, the amount of power stored by the storage battery 12, and the like. The supply control unit 56 controls the supply of excess power. The supply control unit 56 transmits an excess power report, an excess power advertisement, and an end notice, and receives a power request or a supply instruction, a deposit report, and the like. The supply amount calculation unit 57 calculates the amount of power supplied from the power supply device 1 to the power line 4. The reception control unit 59 controls the reception of power from the power line 4. The reception control unit 59 may transmit a power request or a reception end request, or may receive a reception approval, an end notice, or a billing report. The UI control unit 58 receives input of information from a smartphone or the like connected to the operation unit 17 or the communication circuit 16, and outputs information or the like to these. Some or all of these functions implemented by the CPU 51 may be performed by hardware circuits such as an FPGA or a DSP.

According to a first aspect, there is provided a power supply system 100 having a portable first power supply device and second power supply device, that each has a power generation unit and supplies power to a load. Incidentally, the engine generator 10 is an example of a power generation unit. The power supply device 1 is an example of the portable first power supply device and second power supply device. The portable type means that it can be held by a user, and means that it has a handle (a gripping unit) or the like to be grasped by the user's hand.

The power supply device 1a is an example of the first power supply device. The storage battery 12, as illustrated in FIG. 2 and the like, is an example of a power storage unit for storing power generated by the power generation unit. The AC terminal 26a is an example of a first connection unit to be connected to the load 2. The AC terminal 26b is an example of a second connection unit to be connected to the power line 4 which is connected to the second power supply device. The power supply circuit 11 is an example of a supply unit for supplying power stored in the power storage unit to the load 2 via the first connection unit. The power consumption monitoring unit 53 is an example of a monitoring unit for monitoring the power consumption of the load 2. The power consumption monitoring unit 53 monitors the power consumption of the load 2 based on an AC current and an AC voltage detected by the measurement circuit 27. The excess power monitoring unit 54 is an example of a decision unit that decides an excess power of the power storage unit based on the power consumption of the load monitored by the monitoring unit and the amount of power stored in the power storage unit. The power storage amount monitoring unit 55 may estimate the amount of power stored from the voltage of the storage battery 12 measured by the remaining amount sensor 14. The excess power monitoring unit 54 may calculate the excess power by subtracting the power consumption of the load from the sum of the generated power of the engine generator 10 and the amount of power stored of the power storage unit. The supply unit supplies at least a portion of the excess power to the second power supply device via the second connection unit. Incidentally, the supply control unit 56, by controlling the switch circuit 23, supplies at least a portion of the excess power to the second power supply device via the second connection unit. The supply amount calculation unit 57 calculates a total value (power amount) of power supplied from the first power supply device to the power line 4. By virtue of the first aspect, it becomes possible to supply at least a portion of excess power from one portable power supply device to another portable power supply device.

According to a second aspect, the second power supply device has a reception unit that is connected to the power line and is for receiving power through the power line, and has a control unit for controlling the power generation unit of the second power supply device to stop power generation in a time period in which power is being received from the first power supply device through the reception unit. Here, the switch circuit 23 and the reception circuit 25 and the like which are controlled by the reception control unit 59 are an example of the reception unit. The reception control unit 59 may control the engine generator 10 to stop power generation in a time period in which power is being received from the first power supply device. By this, the user can reduce the operating noise of the engine generator 10 and also can conserve fuel.

According to a third aspect, the power supply device 1z is an example of a third power supply device that has a power storage unit and supplies power from the power storage unit to the load 2z. The third power supply device may receive power from the first power supply device via the power line 4, and store the received power in the load 2z connected to the third power supply device or the power storage unit of the third power supply device. Thus one power supply device 1a may supply power to a plurality of power supply devices 1b and 1z.

According to a fourth aspect, the power supply system 100 may be independent of a commercial AC power supply network. As a result, a user can use an electric device even in a campground where a commercial AC power supply network is not maintained.

According to a fifth aspect, the power supply system 100 may further comprise the server 5 which communicates with the first power supply device and the second power supply device via the network 6. The communication circuit 38 of the server 5 is an example of a communication unit connected to the network 6. The power request acceptance unit 33 is an example of an acceptance unit for accepting a request (power request) to receive power from the second power supply device via the communication unit. The excess power acquisition unit 34 is an example of an acquisition unit for acquiring excess power information indicating, via the communication unit, that the first power supply device has excess power. The approval/instruction unit 35 is an example of an instruction unit for, when a reception request is received by the acceptance unit, making an instruction, via the communication unit to the first power supply device which has excess power, such that the first power supply device supplies the excess power to the power line 4.

According to a sixth aspect, the billing unit 36 of the server 5 is an example of a money transfer unit for making a money transfer of a compensation to an account of a user of the first power supply device from an account of a user of the second power supply device.

According to a seventh aspect, the load information collection unit 37 of the server 5 is an example of a collection unit that collects, from the first power supply device via the communication unit, load identification information indicating a load connected to the first power supply device, and that collects, from the second power supply device, load identification information indicating a load connected to the second power supply device.

According to an eighth aspect, the power supply device 1 is an example of a power supply device in a power supply system having a portable power supply device and another power supply device, that each has a power generation unit and supplies power to a load.

In FIG. 13, the UI control unit 58 displays a deposit report, a billing report, an end notice, and the like on a smartphone connected to the operation unit 17 or the communication circuit 16. The UI control unit 58 may receive, from the smartphone connected to the operation unit 17 and the communication circuit 16, a power supply stop instruction and a power supply reception instruction or the like. When a reception instruction is inputted, the reception control unit 59 transmits a power request (reception request) to the server 5 or the like. When receiving a reception end instruction from the operation unit 17 or the like, the reception control unit 59 transmits a reception end request to the server 5 or the like. Upon receiving a supply approval (reception approval) as a response to the power request, the reception control unit 59 controls the switch circuit 23 to start receiving power from the power line 4. The reception control unit 59, upon receiving an end notice from the server 5 or the power supply device 1a or the like, causes an end notice to be displayed on the operation unit 17 or a smartphone or the like connected to the communication circuit 16. Further, the reception control unit 59 may control the switch circuit 23 in accordance with the end notice to cut off the power line 4 and the load 2.

The invention is not limited to the foregoing embodiments, and various variations/changes are possible within the spirit of the invention.

What is claimed is:

1. A power supply system comprising a portable first power supply device and second power supply device, that each has a power generation unit and supplies power to a load, wherein the first power supply device comprises a power storage unit configured to store power generated by the power generation unit;

a first connection unit configured to connect with the load;

a second connection unit configured to connect with a power line connected to the second power supply device;

a supply unit configured to, via the first connection unit, supply, to a load, power stored in the power storage unit;

a monitoring unit configured to monitor a power consumption of the load; and a decision unit configured to, based on the power consumption of the load monitored by monitoring unit and on a power storage amount of the power storage unit, decide an excess power of the power storage unit, and wherein the portable first power supply device is a power supply device that can be held by a user and that comprises a handle to be gripped by a hand of the user, the power supply system is independent of a commercial AC power supply network, and the supply unit comprises an inverter circuit configured to convert at least a portion of the excess power into an alternating current, and is configured to supply, to the second power supply device via the second connection unit and the power line, power of the alternating current outputted from the inverter circuit.

2. The power supply system according to claim 1, wherein the second power supply device comprises a reception unit connected to the power line and configured to receive power via the power line; and a control unit configured to, in a time period in which power is being received from the first power supply device via the reception unit, control the power generation unit of the second power supply device to stop power generation.

3. The power supply system according to claim 1, further comprising a third power supply device comprising a power storage unit and configured to supply power from the power storage unit to a load, wherein the third power supply device is configured to, via the power line, receive power from the first power supply device, and store the received power in a load connected to the third power supply device or the power storage unit of the third power supply device.

4. The power supply system according to claim 1, further comprising a server configured to communicate, via a network, with the first power supply device and the second power supply device, wherein the server comprises a communication unit connected to the network;

an acceptance unit configured to accept a power reception request from the second power supply device via the communication unit;

an acquisition unit configured to acquire, via the communication unit, excess power information that indicates that the first power supply device has excess power, and an instruction unit configured to, when a reception request is accepted by the acceptance unit, make an instruction, to the first power supply device which has the excess power, via the communication unit so that the first power supply device supplies, to the power line, the excess power.

5. The power supply system according to claim 4, the server further comprising a money transfer unit configured to make a money transfer for a compensation to an account of a user of the first power supply device from an account of a user of the second power supply device.

6. The power supply system according to claim 4, the server further comprising a collection unit configured to, via the communication unit, collect, from the first power supply device, load identification information indicating a load that is connected to the first power supply device, and collect, from the second power supply device, load identification information indicating a load connected to the second power supply device.

7. A portable power supply device in a power supply system comprising the power supply device and another power supply device, which each has a power generation unit and supplies power to a load, the portable power supply device comprising:

a power storage unit configured to store power generated by the power generation unit;

a first connection unit configured to connect with the load;

a second connection unit configured to connect with a power line connected to the other power supply device;

a supply unit configured to, via the first connection unit, supply, to a load, power stored in the power storage unit;

a monitoring unit configured to monitor a power consumption of the load;

a decision unit configured to, based on the power consumption of the load monitored by monitoring unit and on a power storage amount of the power storage unit, decide an excess power of the power storage unit; and a handle to be gripped by a hand of a user, wherein the power supply system is independent of a commercial AC power supply network, and the supply unit comprises an inverter circuit configured to convert at least a portion of the excess power into an alternating current, and is configured to supply, to the other power supply device via the second connection unit and the power line, power of the alternating current outputted from the inverter circuit.

* * * * *